July 5, 1938.  R. ABELL  2,122,806
INTERNAL COMBUSTION ENGINE
Filed July 14, 1933  3 Sheets-Sheet 1
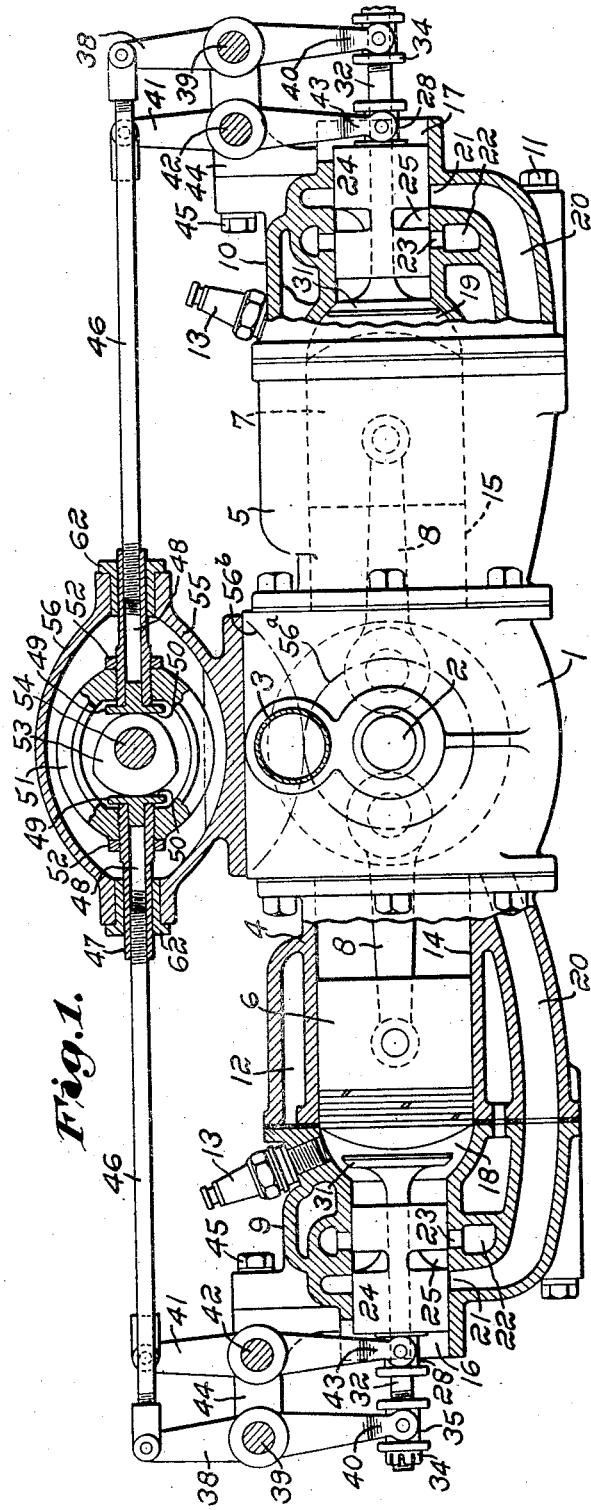
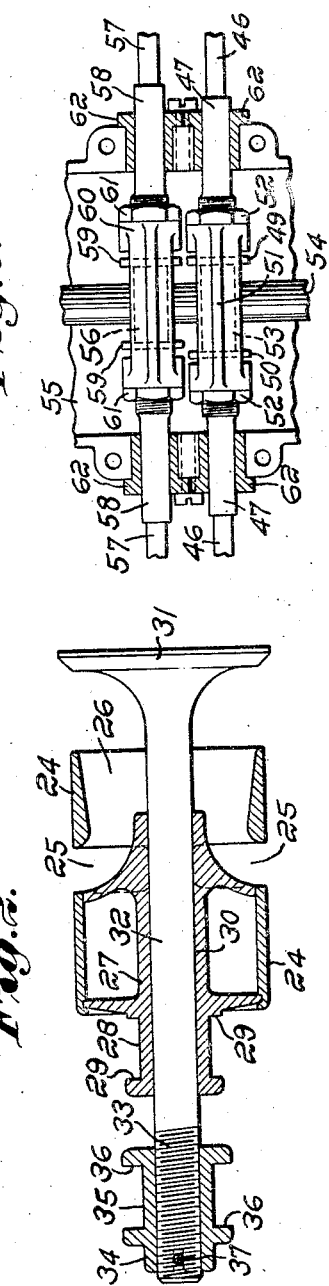
Inventor:
Rollin Abell.

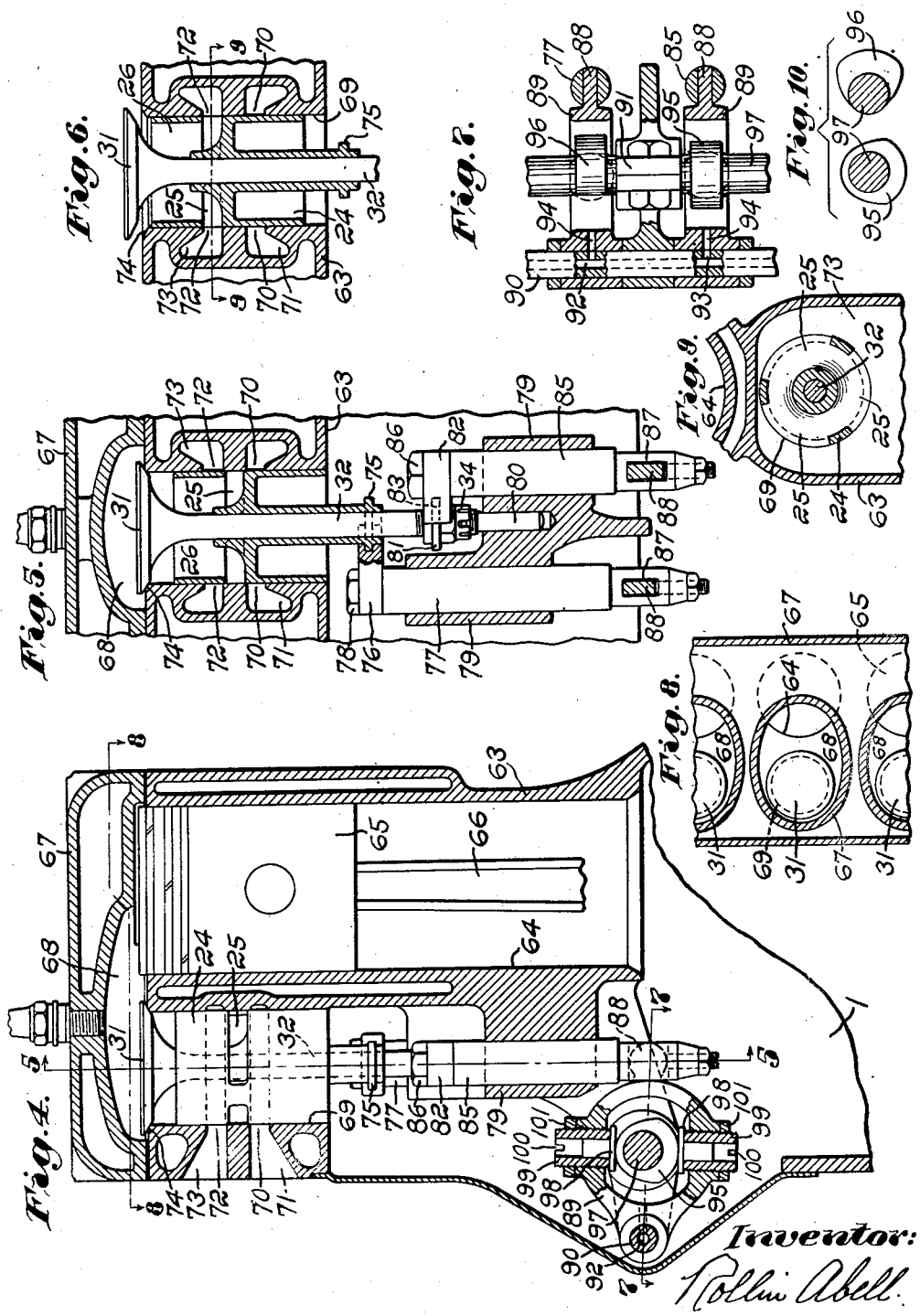

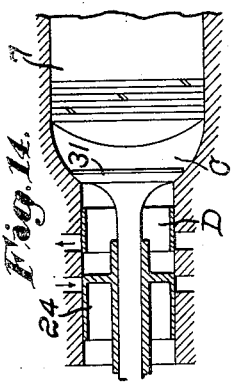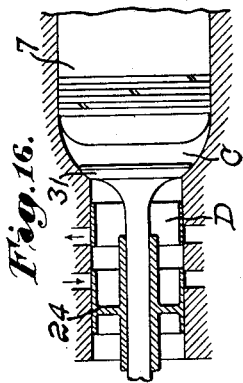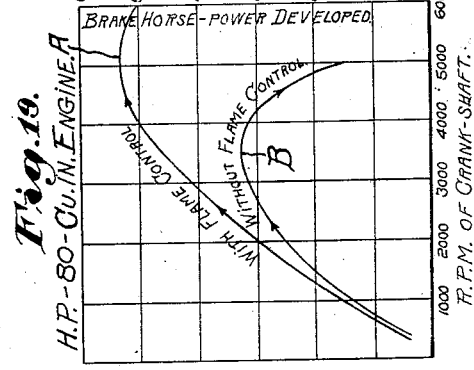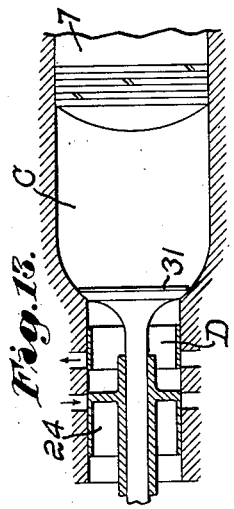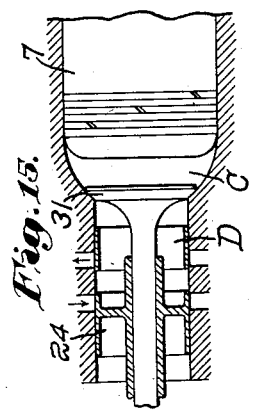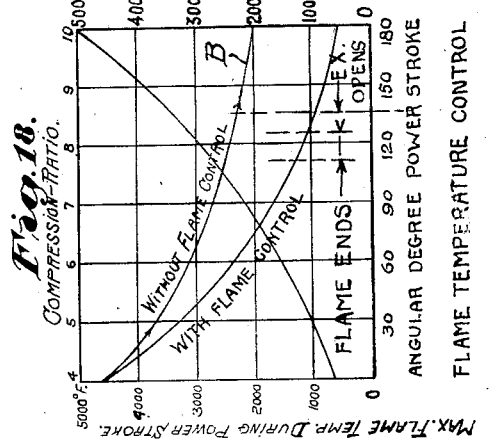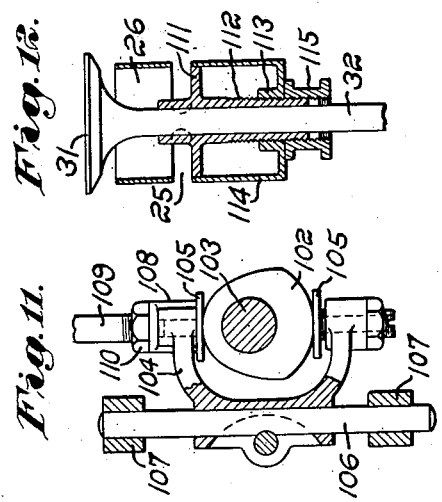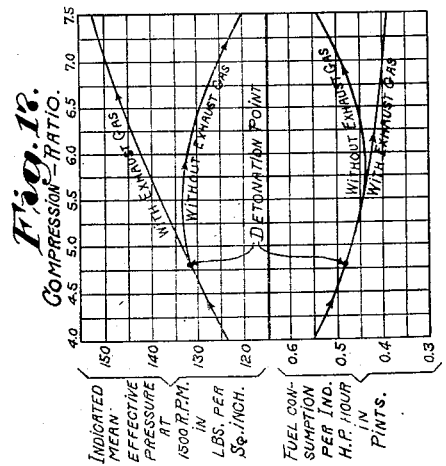

Patented July 5, 1938

2,122,806

UNITED STATES PATENT OFFICE 2,122,806

INTERNAL COMBUSTION ENGINE

Rollin Abell, Milton, Mass.

Application July 14, 1933, Serial No. 680,429

4 Claims. (Cl. 123—79)

This invention relates to internal combustion engines of the four cycle type, using gasoline or lower grades of fuel, with a carbureter and electric ignition.

I have increased the efficiency of the engine by finding practical means for raising the compression when using fuel of any given octane rating and throughly vaporizing the fuel, avoiding detonation, and at the same time producing higher explosion pressure and reducing the temperature of the flame during combustion and eliminating flame in the exhaust.

This results in higher torque and power at both low and high speed, a lower operating temperature and a lower specific fuel consumption and no burning or pitting of the valves.

The valve mechanism comprises a single pressure-sustaining poppet valve in the combustion chamber, in combination with a sliding sleeve distributer, in series with the poppet valve, to control the flow of intake and exhaust gases between the intake and exhaust ports and the combustion chamber, when the poppet valve is open.

Both the poppet valve and distributer are positively operated to insure correct timing and quiet operation at all speeds, by a cam shaft located in the usual position in the crank case the cams having a constant working diameter.

My United States Patent No. 1,311,200, July 29, 1919, shows a poppet valve positively operated by an over-head cam shaft, which was not adapted for use in either the L-head or the overhead valve with cam shaft in crank case, which has become standard practice.

There are several other improvements essential to increasing engine efficiency, which will be apparent from the following specifications and drawings in which:

Fig. 1 is an end elevation, partly in section, of an internal combustion engine illustrating one form of the invention.

Fig. 2 is a detail sectional view, on an enlarged scale, of one valve unit.

Fig. 3 is a detail plan view of the timing cam shaft and associated parts, shown in Fig. 1.

Fig. 4 illustrates the application of my invention to the well known L-head type of engine.

Fig. 5 is a vertical sectional view substantially on line 5—5 of Fig. 4.

Fig. 6 is a detail sectional view of the valve members showing their relative position during the engine exhaust cycle.

Fig. 7 is a plan sectional view substantially on line 7—7 of Fig. 4.

Fig. 8 is a plan sectional view on line 8—8 of Fig. 4.

Fig. 9 is a similar view on line 9—9 of Fig. 6.

Fig. 10 is a detail view of the timing cams showing their relative position.

Fig. 11 illustrates a method of valve and cam connection.

Fig. 12 illustrates a sleeve valve having a variable fuel-measuring chamber.

Figs. 13 to 16 inclusive, are semi-diagrammatic representations of the method and principle involved in my invention.

Fig. 17 is a reproduction of the Ricardo chart illustrating the advantages of higher compression when detonation is suppressed.

Figs. 18 and 19 are charts showing the advantages obtained with my improved engine.

Figure 20 is a chart showing the relative timing arrangement between the engine piston, the poppet valve, and the gas distributor element.

Figs. 21 and 22 are enlarged illustrations of Fig. 10, showing the construction of my improved cams and their relative operating positions during the four cycles.

Greatest engine efficiency is dependent, first, on complete combustion; to obtain complete combustion the mixture must be compressed to a pressure high enough to raise its temperature to a point sufficient to vaporize all the fuel.

With a standard two valve engine it is impossible to raise the compression high enough to fully vaporize the mixture without raising the flame temperature of the explosive gas to the detonation point of the fuel.

To avoid detonation it is necessary to retain about 20% exhaust dilution in the mixture, to limit the temperature, and so a 5-1 compression is about the limit for a standard type of engine.

Ricardo's chart in Fig. 17 illustrates this principle. With the single valve engine it is practical with fuel of low octane rating to operate with low grade fuel with a compression ratio of 10-1 and exhaust gas dilution of 20%, by controlling the dilution with the chamber formed by the distributer sleeve. This is believed to be the first engine built that contains the mechanism to carry out this principle in the proper proportions to obtain these unusual results; with higher grade fuel a lower percentage of dilution can be used.

When the compression ratio of an engine is increased the volume of the combustion chamber is reduced and this is the limitation with the ordinary type of engine with low grade fuel. With the single valve combination the compression ratio can be raised and the dilution of the exhaust gas maintained at any point desired by the proper proportion of the chamber formed by the distributer sleeve which is, during the breathing portion of the cycle, an extension of the combustion chamber. In other words, the volume of the combustion chamber and the distributer chamber together control the dilution. For example, assume that the combustion chamber C, Fig. 13, with valves closed and the piston down, has a capacity of twenty five cubic inches. If at top stroke of the piston the charge is compressed to three cubic inches, Fig. 14, we would have a compression-ratio of 8.33 to 1.

I have obtained excellent results with ordinary fuel by introducing, into the incoming mixture, a quantity of exhaust gases equivalent to approximately two thirds in volume of the compressed charge, which in this case would be two cubic inches, assumed to be the capacity of chamber D of the sleeve valve. It will be clear that at the end of piston exhaust stroke a total of five cubic inches of exhaust gases,—three in the combustion chamber and two in reserve in the sleeve valve,—is available for diluting the incoming charge. The combustion chamber C having a capacity of twenty five cubic inches, as above assumed, would thus receive an incoming mixture of 80% fresh fuel and 20% exhaust gases. In other words, a 20% dilution of the combustible charge in conjunction with a compression-ratio of 8.33 to 1 has been found to give excellent results with no sign of detonation at even top speed and under maximum load conditions with low grade fuel. Detonation heretofore has been characteristic at a compression-ratio of about 4.7 to 1. By the use of an aluminum cylinder head on my improved engine, a compression-ratio of 10 to 1 is practical.

Ricardo's law of flame temperature states that for every one per cent, plus or minus, of exhaust gas mixed with a combustible mixture, the flame temperature is lowered or raised 45 deg. F. Hence, with a 20% dilution the flame temperature is lowered 900 deg. Therefore it will be evident that the flame temperature is controllable by adding more or less exhaust gas to the fuel mixture.

An engine of this nature may be operated by a low grade of fuel under extremely high compression-ratios and at the same time avoid detonation. This results in several distinct advantages among which are, higher torque throughout the entire range of speed, improved acceleration due to better low speed torque, improved cold-weather starting, higher thermal efficiency due to flame temperature control and improved fuel economy as there is practically complete combustion.

Extreme variations in the grade of fuel used may be compensated for by varying the proportion of chamber D. For example, Fig. 15 assumes a chamber D having a capacity of 3 cubic inches which is equal to the compressed charge. Fig. 16 assumes a chamber D having a capacity of 4 cubic inches as compared to the 3 cubic inches of compressed charge. In the two foregoing examples we would have a fuel dilution of approximately 25% and 33% respectively. It will be noted in each case that the compression-ratio has been increased for the purpose of completely vaporizing the lower grades of fuel.

Figures 18 and 19 show charts which are illustrative of the advantages obtained by the use of mechanism to control flame temperature. In Fig. 18, the rapid rise of the compression temperature curve should be noted beyond a compression-ratio of 4.6 to 1. It will be seen that said temperature increases from 75 deg. F. to 450 deg. F. between a 7.6 to 1 and a 10 to 1 compression-ratio, which is approximately 600%. This results in a drier gas due to increased pressure and higher temperature of the mixture. At the left of this chart the flame temperature at the point of ignition, is indicated as approximately 4500 deg. F., which is about the same in any gas engine. The lower edge of the chart is graduated to represent the angular position of the crank away from top center and I have shown a vertical line representing the point at which the exhaust port opens. Curved line A represents the rapid decrease of the flame temperature in my improved engine having flame control mechanism. Curved line B indicates what occurs without flame control. It is known that flame ends at about 1000 deg. F. as shown on the chart. Therefore, it will be clear that where line A crosses the exhaust port line there will be no flame, but where line B crosses it there will be flame because the temperature is approximately 2200 deg. F. as indicated.

From the foregoing it will be clear that any parts, or other mechanism outside the combustion chamber, are not flame-swept during the engine exhaust cycle. This also permits high speed operation of the engine without overheating and detonation. The chart shown in Fig. 19 illustrates the foregoing with respect to speed and horse-power. My improved engine will peak its horse-power at 5000 R. P. M., as shown by curved line A, while another engine of the same size, and using the same grade of fuel, but without flame control mechanism, will peak its horse-power at about 3500 R. P. M., as indicated by curved line B.

Referring now to Fig. 1 of the drawings, I have shown, for purposes of illustration, an engine of the opposed cylinder type; however, it will be understood that my invention is not limited to any particular type of engine nor to any number of cylinders thereof. This illustration comprises an engine having a crank-case portion 1 adapted to receive and support a crank-shaft 2 in the usual manner. A conventional carbureter connection to the crank-case is designated at 3 whereby the fuel supply may be drawn into the crank-case and put under compression by the well known piston action. Cylinder blocks 4 and 5 may be suitably connected to opposite sides of the crank-case 1 and provided with piston members 6 and 7 respectively, adapted to reciprocate therein by means of connecting rods 8 which are attached to the crank-shaft 2 in the usual manner.

Each cylinder block is provided with a head member, 9 and 10 respectively, suitably attached thereto by bolts 11. The usual water passages for cooling purposes are indicated at 12 and spark plugs 13 may serve as ignition elements. Cylinder blocks 4 and 5 are bored as indicated at 14 and 15, respectively, to receive the pistons 6 and 7, cooperating therewith to form part of a combustion chamber. The cylinder heads, 9 and 10, are provided with bores 16 and 17 respectively, which may be in concentric alinement with bores 14 and 15, as shown. The inner ends of bores 16 and 17 may be flared to meet their respective bores 14 and 15 thereby forming compression chambers 18 and 19.

Each cylinder head is provided with a fuel inlet passage 20 which communicates with the crank-case, as clearly shown in Fig. 1, and has a port opening 21 entering the bores 16 and 17. Exhaust passages 22 are provided with ports 23 entering bores 16 and 17, cooperating therewith to conduct burned gases from the combustion chamber to the atmosphere.

My novel valve arrangement is clearly shown in Fig. 2 and comprises a cylindrical sleeve member 24, adapted to reciprocate within bores 16 and 17 and having ports 25 in the periphery thereof adapted to cooperate with ports 21 and 23, in a manner to be presently described. A measuring chamber 26 is in communication at all times with ports 25 and the capacity of said chamber should be predetermined and proportional to compression chambers 18 and 19 for the purpose above referred to. Sleeve 24 may be supported by a hub member 27 or made integral therewith in any suitable manner. Hub 27 may be provided with an extended portion formed with an annular groove 28 presenting side walls, as shown at 29.

A bore 30, extending lengthwise of the hub and positioned concentric to sleeve 24 is adapted to receive a poppet-valve 31 having a stem portion 32 threaded at the outer end thereof as indicated at 33, said poppet-valve being free to reciprocate within the hub 27. The threaded portion is designed to receive a nut 34 having an annular groove 35 presenting side walls 36. Rotation of nut 34 provides adjustment for valve 31 relative to its seat within the combustion chamber and it may be locked in such adjustment by a pin 37.

A rocker-arm 38, pivoted on stud shaft 39, may be provided with a forked end 40 arranged to engage the side walls 36 of nut 34 to transmit reciprocatory motion to the poppet-valve 31. A similar rocker-arm 41 pivotally mounted upon a shaft 42 may have a forked end 43 adapted to engage side walls 29 of the sleeve-valve hub 27, to transmit reciprocatory motion to said valve. Shafts 39 and 42 may be supported by brackets 44 suitably attached to the cylinder head as by bolts 45.

The outer end of rocker-arms 38 are preferably connected by rods 46 to tappet members 47 which are provided with a central bore 48 adapted to receive tappet buttons 49 having cam contacting faces 50 and a hub portion arranged to permit rotation thereof within the bore 48, as shown in Fig. 1. The outer portion of said bore may be threaded to receive rods 46 and permit adjustment thereof relative to tappets 47. The tappets 47 may be threadedly engaged with opposite sides of a yoke member 51 and provided with lock-nuts 52 to maintain adjustment of the tappet buttons relative to a rotary valve-timing cam 53. This cam is so designed that it is always in contact with both faces 50 of the tappet buttons as the cam is rotated; in other words it should be a constant diameter cam adapted to prevent any endwise movement of buttons 49 except by the cam action to be presently described.

The timing cam 53 may be integral with a conventional cam-shaft 54 supported in any suitable manner within a housing comprising a base portion 55, which may be supported by the crank-case as shown, and a removable top plate 56. The cam shaft 54 may be driven from crank-shaft 2, at one-half the speed thereof, in the usual manner as by gears indicated at 56a and 56b. Referring now to Fig. 3, I have shown the sleeve-valve cam 56 and its associated members, which are identical with those just described for the poppet-valve, except that cam 56 provides for slightly greater movement of its tappet than cam 53 does. Rods 57 connect rocker-arms 41 to tappet members 58 which are in turn provided with tappet-buttons 59 arranged to engage cam 56 in a manner similar to the poppet-valve buttons already described. A yoke member 60 is likewise adapted to receive the threaded tappets 58 and lock-nuts 61 are also provided to maintain adjustment as in the previous case. Tappet guide blocks 62 may support and position the units relative to their associated cams.

The various tappet-buttons may be easily adjusted by first removing plate 56 and backing off lock-nut 52 which will permit rotation of tappet member 47 threaded into yoke 51. It will be clear that lengthwise adjustment of the tappet will cause the tappet-button to move toward or away from the cam face, as the case may require. This arrangement permits a much finer adjustment of the valves, relative to their seats and ports, than has heretofore been possible with positively opened-and-closed valves. It should be noted that the same pitch thread should be used between rods 46 and the tappet as between the tappet and yoke 51 in order that no lengthwise movement of the rod will be brought about by rotation of said tappet 47 relative to the yoke. The practice has been to use rollers instead of tappet-buttons, said rollers being fixed relative to the cam face, which required fine machine work for proper fitting and provided no means of adjustment for wear. It will be apparent that my improved tappet unit provides for quick and accurate adjustment thereof to thousandths of an inch with practically no requirement for fine machine work involved.

Figure 4 illustrates one method of using my improved valve and tappet arrangement in an L-head type of engine. The conventional cylinder block is shown at 63 having a vertical bore 64 adapted to receive a working piston 65 which may be connected to the usual crank-shaft (not shown) by a connecting rod 66. A cylinder head 67 is arranged to cooperate with bore 64 to form a combustion chamber 68. A second vertical bore 69 may be provided with an inlet port 70, opening into a fuel supply passage 71, and an exhaust port 72 opening into an exhaust passage 73.

A distributor valve 24, similar to the one previously described, having ports 25 and chamber 26, is adapted for reciprocation within the bore 69. An inlet-and-exhaust poppet valve 31 is guided by the distributer hub as in the previous case, said poppet valve engaging a seat 74, presented by bore 69. The extended hub portion of the distributer in this case, may be provided with an annular rib 75 adapted to receive a grooved tappet connection member 76, which in turn may be connected to a tappet rod 77 as by bolt 78. Rod 77 is preferably guided for vertical reciprocation by a boss 79 extending outwardly from the cylinder block 63.

The poppet valve stem may be extended beyond the threaded portion thereof as shown at 80 and have a sliding fit in boss 79 to permit vertical reciprocation of said valve. This provides additional rigidity for the dual valve unit and permits of lighter construction of parts. The adjusting nut 34, in this case, may be provided with an annular rib 81 adapted to be engaged by another tappet connection member 82 which has a semicircular groove 83 to receive rib 81. This arrangement provides a positive connection between the valve stem and member 82 in a vertical plane but permits rotation of the nut, and likewise of the valve when the nut is locked thereto by means of a pin 84. Tappet connection member 82 may be connected to its tappet rod 85 by a bolt 86. The lower ends of rods 77 and 85 are preferably slotted as indicated at 87 to receive a tongue 88 which extends outwardly from a rocker member 89 pivoted on a shaft 90 suitably mounted in bearings carried by the crank-case, one of which is shown at 91, in Fig. 7. Adjustment studs may be provided for tongues 88 as shown in Figs. 4 and 5.

Shaft 90 is provided with a longitudinal oil passage 92 and radial passages 93 which communicate with passages 94 in the hubs of rocker members 89. Passage 92 is in communication with the engine lubricating system, not shown. It will be clear that this arrangement provides for a stream of oil directed at the timing cams 95 and 96 suitably mounted on cam shaft 97 supported adjacent the crank-case in the usual manner and driven from the engine crank-shaft at a one half to one ratio by a suitable chain or gears, not shown.

Rocker members 89 are provided with tappet buttons 98 carried by adjustable studs 99 and are free to rotate therein. Studs 99 may be threaded into hubs of the rocker members, as shown, and provided with slots 100 to facilitate adjustment thereof and lock-nuts 101 to maintain said adjustment. This arrangement is believed to be novel in combination with positively operated valves and provides for a fine adjustment thereof in either direction laterally to the cam-shaft 97.

Fig. 10 shows the general shape and relative position of the cams, 95 being the poppet valve cam and 96 the distributer cam. They are preferably of the constant diameter design, that is to say, during rotation they always occupy substantially the entire allotted space between the faces of tappet buttons 98, consequently there is only the desired small amount of lost motion between them and their respective cam surface, which may be determined by the adjustability thereof above described. It will also be clear that I obtain a cushioning effect at this point by introducing the film of oil directly onto the cam face as described.

Fig. 6 shows the distributer member 24 in the engine exhaust position with ports 25 and chamber 26 providing communication between the combustion chamber and exhaust passage 73 while the poppet valve is open and remains so until beginning of the compression cycle. It will be clear that during the intake cycle, distributer 24 will be in a down position so that ports 25 will be in communication with the combustion chamber but cut off from exhaust passage 73. During this downward movement of the distributer a definite amount of exhaust gas will be trapped in chamber 26, depending on the capacity thereof, and will be picked up by the incoming fuel and swept into the combustion chamber with it; hence causing a measured dilution of the fresh charge.

Fig. 11 illustrates a design wherein the rocker member 89 may be eliminated and a direct cam action obtained with respect to the poppet valve 31, but this arrangement requires a larger cam 102 and cam-shaft 103. A yoke member 104 may carry tappet buttons 105, the lower one of which is adjustable as previously described. Yoke 104 is fixedly connected to a guide rod 106 slidably mounted in bosses 107 projecting from the engine block. An offset portion 108 of the yoke is adapted to receive the threaded end of a poppet valve stem 109 which may be provided with a lock-nut 110 to permit adjustment of the valve relative to its seat and yoke 104.

Fig. 12 shows a distributer member in which the capacity of chamber 26 may be manually increased or decreased without removal thereof from the engine. A partition forming member 111 has an elongated hub portion 112 in threaded engagement with a hub 113 of the cup-shaped distributer shell 114 having the ports 25 previously described. A lock nut 115, to maintain adjustment between members 111 and 114, may be provided with a rib 116 to be engaged by a tappet connection member similar to 76 in Fig. 5. It will be clear that movement of partition 111 up or down relative to shell 114 will decrease or increase, respectively, the capacity of chamber 26 to vary the percentage of incoming mixture dilution, depending upon the grade of gasoline, or other fuel to be used.

Referring to the valve timing diagram, Fig. 20, it will be clear that the poppet valve controls the exhaust-opening point of operation and also the intake-closing point, it remaining open during this period due to the concentric portion of its operating cam. It will also be clear that the distributor element controls the exhaust-closing point of operation and the intake opening point thereof, the shift, from the former position to the latter, taking place when the engine piston is approximately at top center, whereupon, the combustion chamber is quickly brought into communication with the inlet port; the distributor must then remain in the latter position until after the poppet valve closes, and this is accomplished by the concentric portion of its operating cam. It will be noted that the various valve operations and timing have been maintained with respect to standard gas engine practice.

Figs. 21 and 22 illustrate the geometric construction of my improved cams having a constant working-diameter. The cam axis of rotation is indicated at E from which point radii F and G are used to locate the high and low levels of the cams, respectively, the difference in length of these radii being equivalent to the amount of reciprocating motion required to actuate a valve. Radii H and H' Fig. 20, are taken from points J and J' respectively, at the outer ends of radius F, and each must be equal to F plus G. It will be understood from the foregoing that the working-diameter of this cam is constant throughout rotation thereof and that in order to function it must have certain portions thereof concentric with the axis of rotation, shown at E.

The distributor cam 96, Fig. 22, is constructed upon the same basic principle, radii F and G being taken from point E. In this case it is preferable to use two radii, K and K', to join F and G together, but their total lengths must equal F plus G. It will also be noted that this cam must have certain portions thereof concentric with point E, the axis of rotation. Lines L—M and L'—M' define the relative portions of each cam brought into contact with its tappet element during the various operating cycles. It will be seen that cam 95 has a contour made up of four true arcs of a circle while cam 96 comprises six true arcs.

These improved cams when associated with flat tappet buttons present an arrangement wherein it is possible to eliminate all lost motion between them and thereby provide a silent mechanism and greatly reduce the wear thereof, both of which are vital to satisfactory operation.

I claim:

1. In an internal combustion engine, having a combustion chamber including a cylinder, and a piston working in the cylinder, the combination therewith of a distributor chamber, adjacent to the combustion chamber, connected thereto and having the inlet and exhaust ports; a poppet valve controlling said connection between chambers; and valves controlling said ports; the said distributor chamber having a movable wall portion whereby said chamber is volumetrically expansible and contractible; actuating mechanism, for expanding and contracting said chamber and for operating the valves, synchronized for the exhaust port to be open when the chamber is contracted and the inlet port to be open when the chamber is expanded.

2. An internal combustion engine as in claim 1, wherein the said distributor chamber has a sliding closed-sleeve closure, and has in its wall the inlet and exhaust ports, controlled by the sliding of the sleeve; the inlet port being more remote from the cylinder than is the exhaust port, and the sleeve having a port for registering with the inlet and exhaust ports, and having a cross wall for its said closure at a location in the sleeve which is more remote from the cylinder than the said port of the sleeve.

3. An internal combustion engine, as in claim 1, wherein the said actuating mechanism comprises connecting means for positive propulsion of each of the valves and the distributor chamber wall in both directions in predetermined synchronism throughout the full operating stroke of each, with the expanding of the chamber timed to occur at the closing of exhaust valve and opening of inlet valve, whereby the volume of the two chambers, containing spent gases, into which the fresh charge is taken, exceeds the volumetric capacity which those two chambers had at the entrapping of exhaust gases by the closing of the exhaust port.

4. An internal combustion engine, as in claim 1, wherein the said distributor chamber has an end closure which is mounted adjustably relative to the other walls of that chamber, whereby the setting of it in a different adjustment sets the total volumetric capacity of the two chambers at a different measure.

ROLLIN ABELL.